J. Maltby.
Horse Rake.

No 3369  Patented Dec. 5, 1843.

UNITED STATES PATENT OFFICE.

JAMES MALTBY, OF NORTH BRANFORD, CONNECTICUT.

IMPROVEMENT IN HORSE-RAKES.

Specification forming part of Letters Patent No. 3,369, dated December 5, 1843.

*To all whom it may concern:*

Be it known that I, JAMES MALTBY, of North Branford, in the county of New Haven and State of Connecticut, have invented a new and useful machine for raking hay, straw, or grain, called the "Pivot-Rake," which may be worked by hand, horse, or any other power that can be applied in agricultural field operation; and I do hereby declare that the following is a full, clear, and exact description of the construction and operation of the same, reference being had to the annexed drawings, making a part of this specification.

Figure 1:
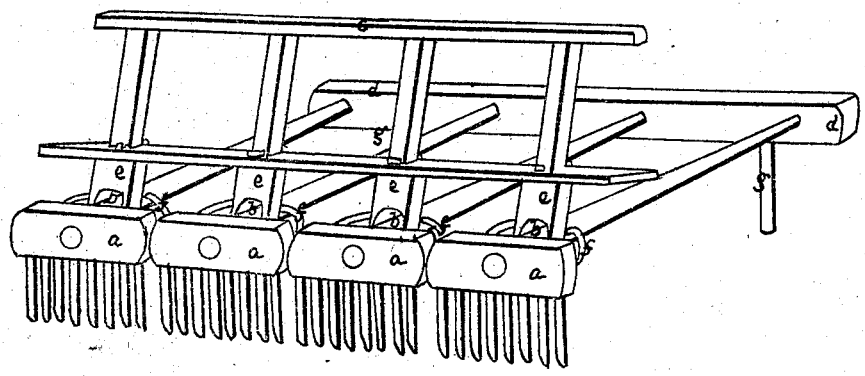

Figure 1 represents a perspective view of the machine and the brake which serves to elevate or depress the rakes, the heads of the rakes and the brake being in the foreground. Letter *a* represents the heads of the rakes, four in number; *b*, the handles of the rakes, which pass through a strong leading-bar, to which they are attached by passing through holes in which they can turn or revolve with ease when the rake meets with any obstruction in passing over the ground. *d d* is the leading-bar to which the horse or other power is applied; *c*, the brake-handle, held by a man or boy when the machine is in motion, for the purpose of elevating or depressing the rakes; *e*, parts of the brake into which crotches are cut, by which the weight of the brake is made to depress the rakes. These parts are fitted to the handles *b b b b*, near the heads *a a a a*, within the head-hoops *f f f f* of the rakes. *g g* are props, upon which the leading-bar rests when the machine is not in motion. While it is moving they are raised above the ground by force of the motive power. The drawings present four heads, each two feet in length, having a space of two or three inches between them, leaving room for the rakes to turn upon meeting with any obstruction, but not enough for the hay or straw to escape. Each rake has eight teeth. The number of heads and teeth in each may be lessened or increased, but the proportions here given are considered the best. Teeth must be of wood.

Figure 2:
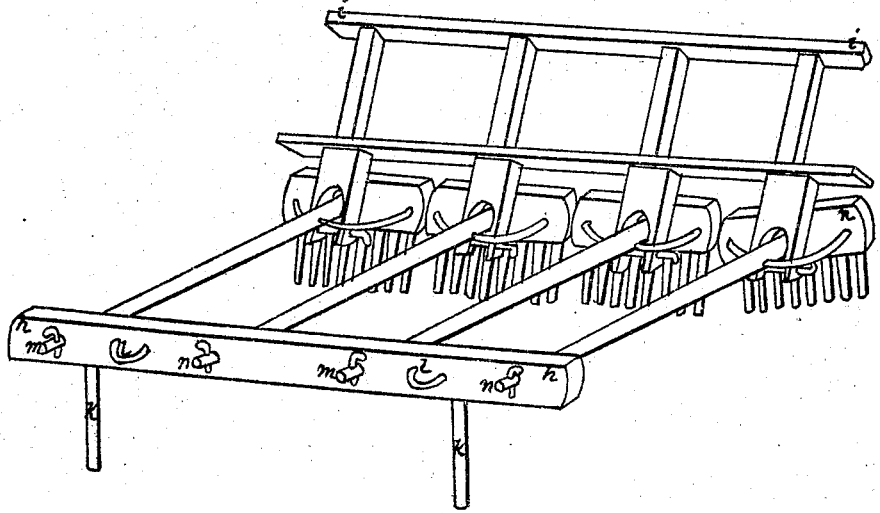

Fig. 2 represents the machine with the leading-bar in front; *h h*, the leading-bar; *i i*, the brake-handle; *k k*, the props; *l l*, iron wings for attaching the traces when horse-power is used; *m m m m*, the ends of the rake-handles passing through holes in the leading-bar, in which they turn when the rake meets an obstruction. *n* represents one of the rakes as rising over an obstruction by the turning of the handle in the leading-bar. The rakes are connected with the leading-bar by pins of wood or iron passing through the end of their handles where they protrude in front of the bar. The bar must be three inches square, more or less.

The brake is used by hand to elevate or depress the rakes in motion, and to prevent the heads from rising to high in any part upon moving over an obstacle and to force them back to a level when it is overcome.

What I claim as my invention, and desire to secure by Letters Patent, is—

1. The mode herein described of constructing a horse-rake—that is to say, by combining a number of rakes with the leading-bar in the manner described, the handles of said rakes passing through and turning freely in the leading-bar, for the purpose aforesaid.

2. In combination with the above, the brake, constructed and operating as described.

JAMES MALTBY.

In presence of—
JONATHAN STODDARD,
HENRY C. FLAGG.